(12) United States Patent
Herberger et al.

(10) Patent No.: US 9,552,829 B2
(45) Date of Patent: Jan. 24, 2017

(54) SYSTEM AND METHOD FOR LOW-LOSS REMOVAL OF STATIONARY AND NON-STATIONARY SHORT-TIME INTERFERENCES

(71) Applicant: MAGIX AG, Berlin (DE)

(72) Inventors: Tilman Herberger, Dresden (DE); Titus Tost, Dresden (DE); Georg Flemming, Dresden (DE)

(73) Assignee: BELLEVUE INVESTMENTS GMBH & CO. KGAA (DE)

( * ) Notice: Subject to any disclaimer, the term of this patent is extended or adjusted under 35 U.S.C. 154(b) by 0 days.

(21) Appl. No.: 14/702,541

(22) Filed: May 1, 2015

(65) Prior Publication Data

US 2015/0317997 A1 Nov. 5, 2015

Related U.S. Application Data

(60) Provisional application No. 61/987,236, filed on May 1, 2014.

(51) Int. Cl.
| | | |
|---|---|---|
| *G10L 21/0232* | (2013.01) | |
| *G10L 21/02* | (2013.01) | |
| *G11B 27/031* | (2006.01) | |
| *G10L 21/0208* | (2013.01) | |
| *G11B 20/24* | (2006.01) | |
| *H04N 5/765* | (2006.01) | |
| *H04N 5/932* | (2006.01) | |
| *H04N 9/79* | (2006.01) | |

(52) U.S. Cl.
CPC ....... *G10L 21/0232* (2013.01); *G10L 21/0202* (2013.01); *G10L 21/0208* (2013.01); *G11B 27/031* (2013.01); *G11B 20/24* (2013.01); *H04N 5/765* (2013.01); *H04N 5/932* (2013.01); *H04N 9/7908* (2013.01)

(58) Field of Classification Search
CPC .. G10L 21/0208; G10L 25/78; G10L 21/0232; G10L 15/20; G10L 19/005; G10L 15/02; G10L 25/87; G10L 21/0272; G10L 19/012; G10L 25/69; H04N 9/7908; H04N 5/911; G11B 20/24
USPC .......... 704/226–228, 233; 386/263; 381/94.3
See application file for complete search history.

(56) References Cited

U.S. PATENT DOCUMENTS

| 6,910,011 | B1 * | 6/2005 | Zakarauskas | ....... G10L 21/0208 704/226 |
|---|---|---|---|---|
| 2003/0200086 | A1 * | 10/2003 | Kawazoe | ................ G10L 15/20 704/239 |
| 2006/0140613 | A1 * | 6/2006 | Aikawa | .................. G03B 13/36 396/133 |
| 2010/0086141 | A1 * | 4/2010 | Nicolino, Jr. | ............ H04R 5/04 381/57 |
| 2011/0081026 | A1 * | 4/2011 | Ramakrishnan | .... G10L 21/0208 381/94.3 |

(Continued)

*Primary Examiner* — Gelek W Topgyal
(74) *Attorney, Agent, or Firm* — Fellers, Snider, Blankenship, Bailey & Tippens, P.C.; Terry L. Watt

(57) ABSTRACT

According to a preferred aspect of the instant invention, there is provided a system and method that allows the user to remove stationary and not stationary short time interference signals in speech or other recordings in the audio part of a video recording. The system is automatically analyzing the input signal and in a plurality of individual steps detects the interference signal and removes it accordingly.

6 Claims, 5 Drawing Sheets

(56) References Cited

U.S. PATENT DOCUMENTS

| | | | |
|---|---|---|---|
| 2011/0238418 A1* | 9/2011 | Wang | G10L 21/0208 704/233 |
| 2011/0288858 A1* | 11/2011 | Gay | G10L 21/028 704/226 |
| 2011/0305348 A1* | 12/2011 | Jin | G02B 7/102 381/71.7 |
| 2013/0065581 A1* | 3/2013 | Hwang | H04B 17/336 455/422.1 |

* cited by examiner

SYSTEM AND METHOD FOR LOW-LOSS REMOVAL OF STATIONARY AND NON-STATIONARY SHORT-TIME INTERFERENCES

This application claims the benefit of U.S. Provisional Patent Application Ser. No. 61/987,236 filed on May 1, 2014, and incorporates said provisional application by reference into this document as if fully set out at this point.

FIELD OF THE INVENTION

The present invention relates to the general subject matter of creating and analyzing video works and, more specifically, to systems and methods for analyzing the audio part of video recordings to attenuate ambient noise.

Removal or attenuation of ambient noise in video recordings is a subject matter in which a number of different approaches exist, all trying to be the most effective solution without harming the integrity of the input signal. Many known methods to attenuate or remove ambient noise in video recordings at the current state of the art utilize the principle of "spectral subtraction". In this approach a filter function is determined by estimating the average magnitude of the interfering signal and subtracting it from the magnitude of the target signal. The characteristics of the interfering signal can be automatically determined by a targeted search for unwanted components which might be found, for example, in breaks between the speech (or other target) content with the audio material. Another way to determine an estimate of the interfering signal is to let the user define a noise sample—a sample of audio material that contains only or predominantly the interfering signal. This approach is well-known and is often utilized in software based solutions.

The approaches known in the state of the art typically operate by determining the average of short time magnitudes of the interfering signal. This averaging is useful for interfering signals with a stochastic character such as ambient noise or for stationary interfering signals such as a buzzing-type signal. Interfering signals from motors, especially zoom- and autofocus motors in digital cameras usually exhibit a non-stationary behavior: The sound behavior of the interference can be variable and its frequency response often changes fluently/continuously. For a zoom motor the pitch will generally depend on the intended focal length, respectively on the focal length of the objective that has been passed through during the set up process. In this case the averaging of the short time magnitude of the interfering signal would lead to a broad band filtering which would unnecessarily remove substantial parts of the input signal.

Methods according to the state of the art usually implement the filtering process continuously for the whole length of the impaired input signal. In the case of an interfering signal that only occurs intermittently the input signal will also be subjected to a filtering process in the undisturbed passages that are often longer, ultimately leading to a deterioration of the audio quality of the input signal in these undisturbed passages.

Heretofore, as is well known in the media editing industry, there has been a need for an invention to address and solve the above-described problems. Accordingly it should now be recognized, as was recognized by the present inventors, that there exists, and has existed for some time, a very real need for a system and method that would address and solve the above-described problems.

Before proceeding to a description of the present invention, however, it should be noted and remembered that the description of the invention which follows, together with the accompanying drawings, should not be construed as limiting the invention to the examples (or preferred embodiments) shown and described. This is so because those skilled in the art to which the invention pertains will be able to devise other forms of the invention within the ambit of the appended claims.

SUMMARY OF THE INVENTION

There is provided herein a system and method for removal or attenuation of interfering noise in audio material, and especially where the target signal is speech contained in the audio portion of video material. An embodiment removes or attenuates temporarily occurring (e.g., transient) stationary and non-stationary interfering noise, e.g., interference from zoom and autofocus motors in digital video cameras or digital photo cameras with video recording functionality. An embodiment may be applied only to the particular passages containing interfering noise.

One embodiment modifies the process of "spectral subtraction" by incorporating a dynamic approach, with the goal being to limit the filtering electively to only the disturbed or otherwise noise contaminated portions of the signal.

An embodiment taught herein introduces a modification to the process of calculating a filter according to the method of "spectral subtraction" which is described, among others, in Chapter 11 of Vaseghi's "Advanced Signal Processing and Noise Reduction", 2000, John Wiley & Sons, the disclosure of which is incorporated herein by reference as if fully set out at this point. In addition to calculation of the transfer function by determining the difference between spectral magnitudes, the frequency domain expression of the transfer function can be down-weighted by setting it to a value of 0 if the maxima of short time magnitudes of the disturbed input signal and of the interfering signal match spectrally. With this modification the accuracy of the filtering process will be improved.

Additionally, an embodiment makes it possible to parameterize the algorithm in such a way that the transfer function is primarily determined by the spectral matching maxima of the short time magnitudes of the input signal and the interfering signal. In this case the relevant tonal parts of the interference will be removed or attenuated and the rest of the input signal will be only minimally affected.

One object of an embodiment is to modify the standard process of "spectral subtraction" by utilizing the short time magnitude of the interfering signal that has the highest conformity with the determined short time magnitude of the input signal containing the interference. This correspondence is then utilized for the calculation of the transfer function of the filter, thereby attenuating the interfering signal. With this approach it will be possible for the resulting transfer function to stay comparatively narrow-banded, which will impair the input signal much less.

In an embodiment, the instant invention will be explained with reference to four stages that together make up the algorithm for low-loss removal of stationary and non-stationary short time interference. This approach is robust and tolerant of the volume differences between the impaired input signal and the recorded noise sample of the interference signal.

An embodiment begins with an analysis of the input signal, Component A. This phase is intended to detect the best possible match between an example of an interfering signal, preferably a sample in which the target signal is absent so that noise/interfering signal alone is present, with the portions of the input signal that is contaminated by the same sort of noise and, thus, that contains signal plus interference. The second Component B is performs an analysis of the input signal to detect adjacent sections containing evidence of interference. Continuing with the present embodiment, the third Component C will remove the interfering signal via adaptive filtering. In the last Component D the transfer function of the adaptive filter will be determined.

According to an embodiment, with respect to Components C and D, calculation of the removal of the interference signal and calculation of the associated transfer function, could be implemented in real time, although that is not a requirement.

According to one embodiment, in Component A the input file or recording containing a noise sample of the interfering signal and the file or recording containing the impaired input signal will be analyzed and the results stored in memory. The results of the Component A analysis will be passed to Component B, whose results will also be stored in memory. The resulting data from Components A and B will then be utilized in the calculation of the transfer function of the adaptive noise attenuating filter generated in Component C handles removal of the interfering noise, preferably in real time. The data from Component A will be used to determine which section of the noise sample should be used for the calculation of the transfer function of the interference noise removing filter. The data from Component B will be utilized to determine whether or not dampening of the interference noise is carried out section by section in full or lesser strength. The level of dampening will be fully adjustable by the user.

Other embodiments and variations are certainly possible within the scope of the instant invention and can readily be formulated by those of ordinary skill in the art based on the disclosure herein.

The foregoing has outlined in broad terms the more important features of the invention disclosed herein so that the detailed description that follows may be more clearly understood, and so that the contribution of the instant inventors to the art may be better appreciated. The instant invention is not limited in its application to the details of the construction and to the arrangements of the components set forth in the following description or illustrated in the drawings. Rather the invention is capable of other embodiments and of being practiced and carried out in various other ways not specifically enumerated herein. Additionally, the disclosure that follows is intended to apply to all alternatives, modifications and equivalents as may be included within the spirit and the scope of the invention as defined by the appended claims. Further, it should be understood that the phraseology and terminology employed herein are for the purpose of description and should not be regarded as limiting, unless the specification specifically so limits the invention.

BRIEF DESCRIPTION OF THE DRAWINGS

Other objects and advantages of the invention will become apparent upon reading the following detailed description and upon reference to the drawings in which.

Figure 1:
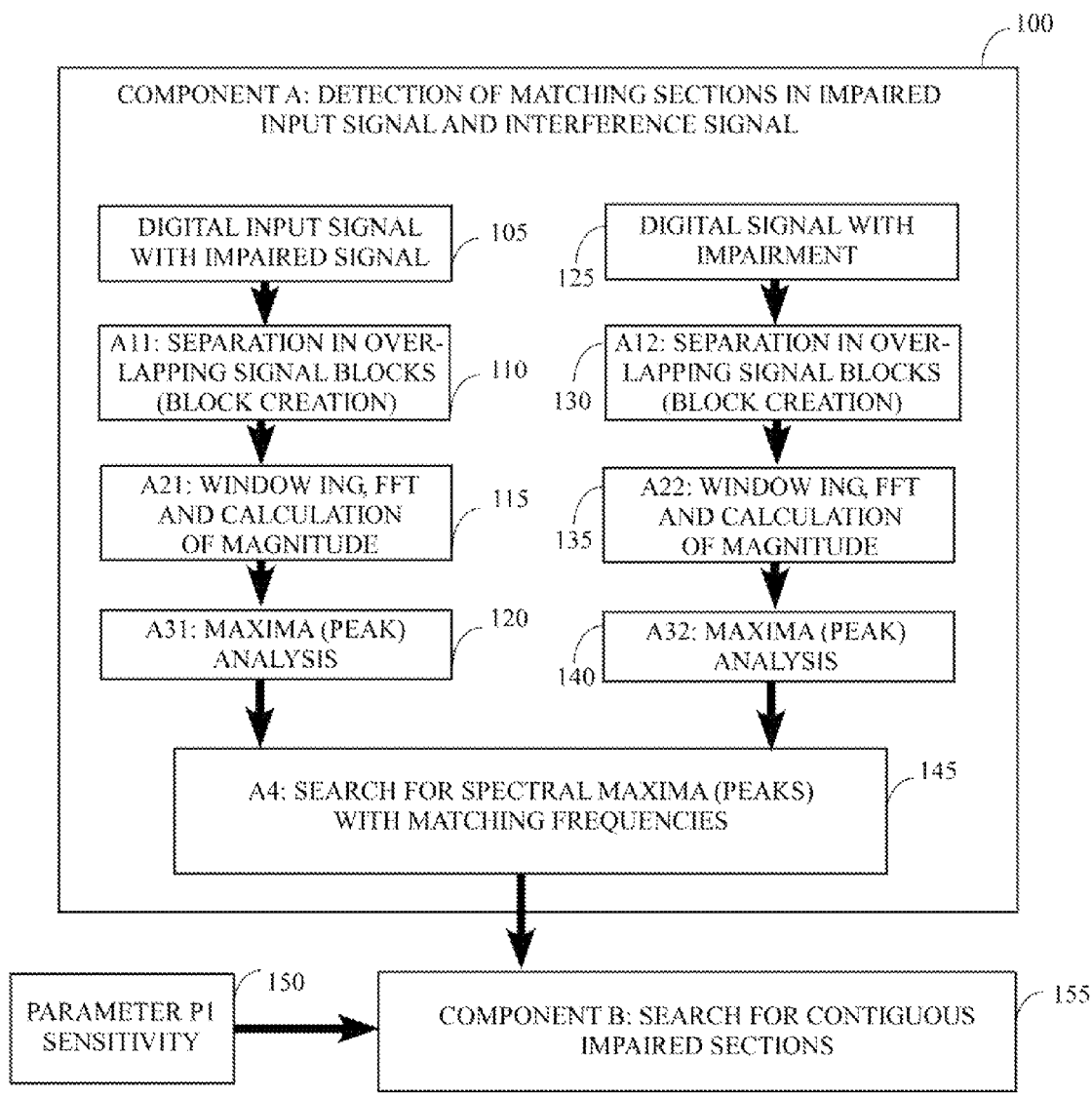
FIG. 1 depicts an operating logic suitable for use with an embodiment which contains some details of Components A and B.

DESCRIPTION OF THE PREFERRED
EMBODIMENTS

Referring now to the drawings, wherein like reference numerals indicate the same parts throughout the several views, there is provided a preferred system and method for low-loss removal of stationary and non-stationary short-time interferences in audio material and, in some embodiments, in the audio track of video recordings.

Figure 6:
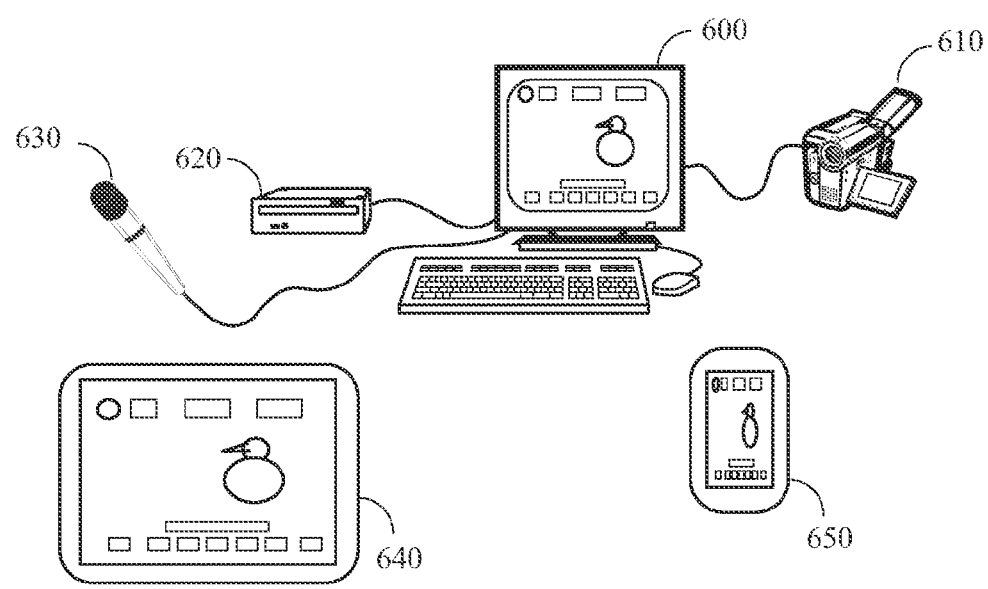
FIG. 6 contains a general example of one possible environment of the invention.

As is generally indicated in FIG. 6, at least a portion of the instant invention could be implemented in form of software running on a user's computer 600, where the term "computer" is intended to encompass any programmable device capable of performing signal processing of the sort described herein (including, without limitation, cell phones 650, tablet computers 640, etc.). Such a computer will have some amount of program memory and data storage capability 620 (whether internal, external, or accessible via a network) as is conventionally utilized by such units. Additionally it is possible that an external camera 610 of some sort would be utilized with—and will preferably be connectible directly or indirectly (e.g., via removable storage) to—the computer 600 so that video and audio and/or graphic information can be transferred to and from the computer. Additionally, some aspects of an embodiment might be performed within the camera 610. Preferably the camera 610 will be a digital video camera with audio recording capabilities, although that is not a requirement and in some instances the input might be a recording obtained via one or more microphones 630 which could be connected directly to the computer or connectable indirectly via removable storage or wireless communication. Further given the modern trend toward incorporation of cameras and microphones into other electronic components (e.g. in handheld computers, cell phones, laptops, etc.) those of ordinary skill in the art will recognize that the camera and/or microphone might be integrated into an electronic device rather than being a stand alone component. Although the camera will preferably be digital in nature, any sort of camera might be used, provided that the proper interface between it and the computer is utilized.

An embodiment preferably begins with the reading of two digital signals 105 and 125 into a personal or other computer, to include portable computers such as tablet computers, cell phones, etc. The input to box 105 is the input or target signal, e.g., the audio part of a video recording, and the input signal 125 is a noise-only recording or, more specifically, a digital representation of the noise that contaminates the target recording 105. In some cases, the selection of the noise-only recording will be performed at the hands of the user, who might be instructed to record a sample of the noise, select a passage within the target signal that is essentially all noise, etc.

Broadly speaking, the first few steps of the current embodiment analyze the input to find the best possible matches of a noise sample of the interference signal 125 with the sections of the impaired (i.e., noise plus signal) input signal 105. The best matches between the single sections of the recorded interference signal—the noise sample and the single sections of the impaired input signal will be determined in this embodiment by matching the frequencies of spectral maxima—the peaks. The number of spectral maxima (peaks) with matching frequency can be utilized to determine the quality of the match.

Turning now to the embodiment of FIG. 1, according to a first preferred step both data files 105 and 125 will be partitioned into overlapping windows or, equivalently, blocks 110 and 130 which are weighted by a windowing function (e.g., a Gaussian taper, a Hanning taper, a Hamming taper, etc.). In some embodiments, the amount of overlap between adjacent windows might be 75%, but other choices are certainly possible. By utilizing a Fast Fourier Transform ("FFT") or a similar calculation of frequency content, (e.g., a full Fourier Transform, a Walsh transform, a wavelet transform, etc.) the absolute value the spectral short time magnitudes of each of the windows will be calculated 115 and 135. In some embodiments, a window length of 4096 samples might be used. The sample rate of the input can be freely chosen but often it will be between about 16 and 192 kHz. One sample rate that is often useful is 44.1 or 48 kHz.

Next, in this embodiment the short time magnitudes will be analyzed to identify their spectral maxima (peaks) 120 and 140, each of which corresponds to a dominant frequency that is present in the signal. For purposes of the instant disclosure, the phrase "dominant frequency" will be used to indicate those frequencies in either the target signal or the noise signal that correspond to significant peaks in the frequency spectrum and, more particularly, to those frequencies that correspond to the largest peaks in the spectrum. In this step the spectral maxima of the short time magnitudes of the impaired input signal will be compared with the spectral maxima of the short time magnitudes of the noise sample to determine where there is a match of the frequencies in both signals 145.

Within each block, typically between 50 and 250 peaks in the frequency spectrum will be identified as dominant. Preferably, the most significant peaks will be used in the steps that follow. In case of passages that are relatively noise-free, the number of peaks identified might be between 10 and 50. The individual short time magnitudes and the positions of the spectral maxima, the peaks of the noise sample will be identified and stored at least temporarily, because the locations of the peaks is used in the calculation of the transfer function of the adaptive interference signal removing filter as discussed below. Methods of identifying peaks within a spectrum or other digital series are well known to those of ordinary skill in the art.

In a further step, the signals will be analyzed to detect portions of the target signal that are contiguous to sections that have already been flagged as containing interfering noise 155. One aim of this step is to utilize the results from component A to determine the sections of the noise contaminated input signal in which the impairing noise is present in windows other than those already identified. Of course, one reason for performing this step is that if a block is determined to be contaminated by noise it will often be the case that blocks adjacent to it (either earlier or later in time) will also be contaminated by noise. Often the analysis will be performed at least at each end of a group of blocks.

In connection with the current embodiment, groups of 10 contiguous blocks will be identified and used to determine the value with the minimal match of spectral maxima, peaks. More specifically, for each group of 10 blocks, the average of the maximum peak values in each block and the average of the minimum peak values in each block will be calculated.

These values will then be utilized according to the present embodiment to screen the peaks that will subsequently be used. For example, a threshold value might be selected which sets a minimum as to the spectral matches that will used subsequently: e.g., spectral peaks below this value will not be counted. Alternatively, if the number of matching peaks within a signal block is significantly higher than a predetermined count threshold, the block will be flagged as a noise impaired signal block. In some embodiments, the sensitivity of the detection will be adjustable with a threshold factor (e.g., a multiplier) Parameter P1, which can be selected by the user 150. As an example, P1 might be based on some measure of the variability of the minima so that peaks that exceed P1 will be those peaks that are statistically higher than the average (e.g., one standard deviation higher). A P1 might also be used in connection with an analysis of the number of matching peaks between the noise signal and the subject signal as modified by thresholding or other screening.

In other embodiments, rather than using the spectral values, counts of the number of matching peaks will be used instead. That is, this variation the number of matching peaks within each block will be determined. The average number of matches in all blocks will then be calculated. Then, those blocks that have an above average number of matches will be flagged as having noise present therein. In some cases, a numerical threshold might be imposed so that only those counts that exceed the average by some designated amount (e.g., by some percentage of the average, by a multiple of the standard deviation of the counts in that group, etc.) would be designated as being contaminated by noise.

In a further preferred step the neighboring (e.g., contiguous) blocks of the signal blocks in the target that are designated as impaired will be inspected to determine if the number of matching spectral maxima are slightly (e.g., 10%) above the average value of the average count of spectral matches in a block. In this case the signal block will also be identified as an impaired signal block.

With respect to a stereo recording, the same process could then be applied to the corresponding signal section of the other stereo channel, if such is available. If a signal block of one stereo channel is determined to be an impaired signal block, the signal block of the other stereo channel could also be assigned this property, provided that the determined number of matching spectral maxima is slightly above the average value for the minimum spectral maxima matching. Of course, as an example, depending on the original placement of the microphones that collected the target signal, it is certainly possible that a noise source might be present on one channel but not the other or that the noise characteristics on two channels might be different. In such an instance, the two channels might be processed separately according to the methods taught herein.

Figure 2:
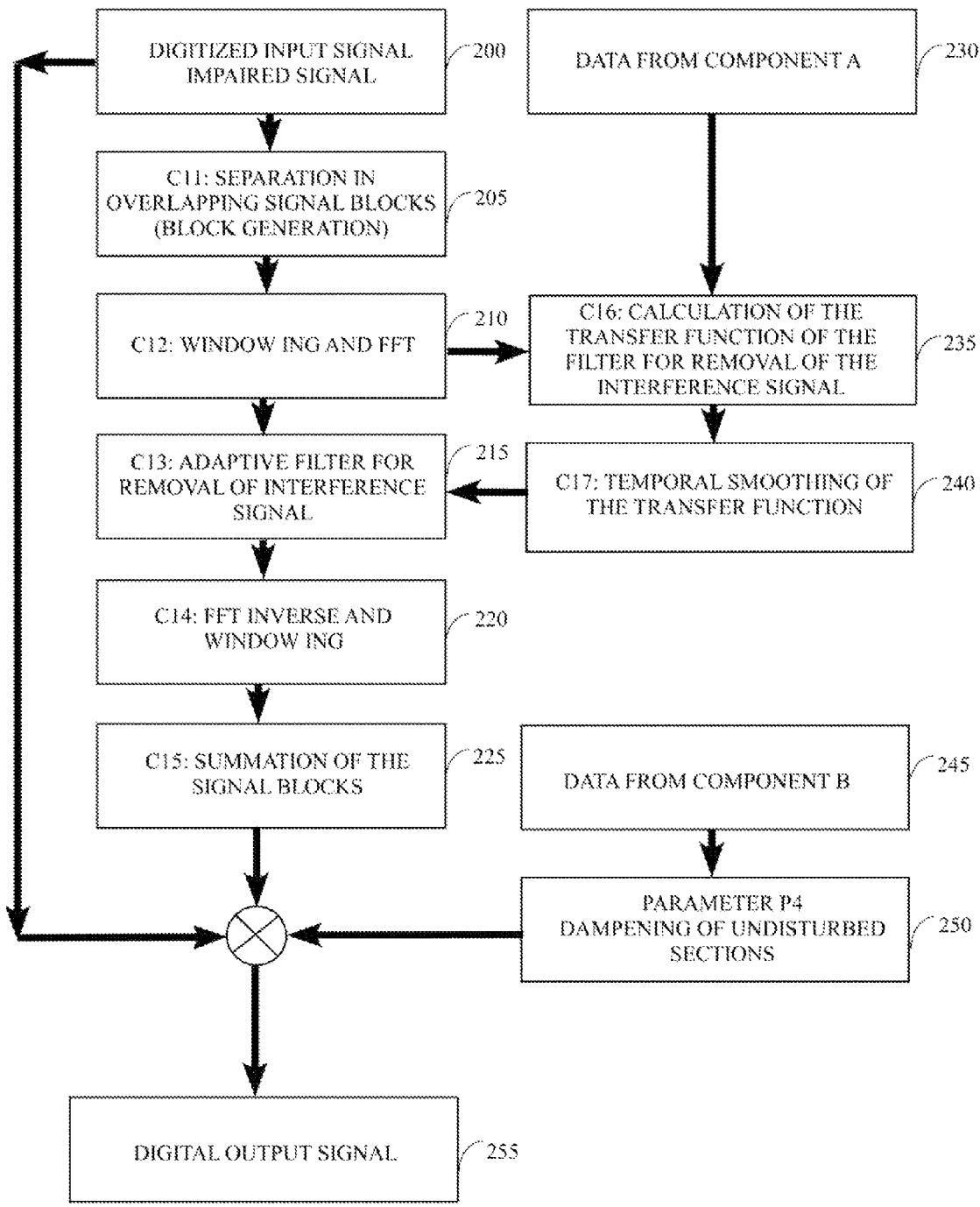
FIG. 2 illustrates the steps of associated with adaptive filtering in the frequency domain for removal of the interfering signal according to one embodiment.

Turning next to the example of FIG. 2, next the removal of the interfering signal from the target signal is performed with an adaptive filter that operates in the frequency domain 215. Note that in the text that follows, some of the steps that are called for are well known to those of ordinary skill in the art (e.g., Fourier transform) and, as such, details related to these steps will not be explained in full herein.

As an initial step and according to the embodiment of FIG. 2, the input signal 200 will be partitioned into overlapping blocks 205, a windowing function will be utilized as described previously, and a FFT (or other transform) will be used to transform the signal into the frequency domain 210, thereby producing a complex spectrum.

Next, the resulting complex spectrum of the input will be multiplied by a short time invariant filter function that is designed to remove or attenuate the noise relative to the target signal. The next step according to this embodiment will transform the filtered spectrum back into the time domain via an inverse FFT, followed by a windowing operation 220 and a summation or other compilation of the individual time-domain blocks 225 to construct a non-windowed and filtered signal.

The transfer function of the filter will be subjected to temporal smoothing to reduce artifacts (chirping artifacts, for example) 240 before application to the target signal. The time constants used the control the decline and rise of the smoothing filter can be defined separately in the some embodiments. Continuing with the present example, the input signal will next be mixed with the filtered signal. If in component B a section is determined to be undisturbed 245, the mixing ratio will be changed according to the setup of parameter P4 (which might be allowed to vary between 0.0 and 1.0) in such a way that the portion of the unfiltered input signal in the combination increases accordingly 250. In an embodiment it may not be necessary to apply the filtering process to the sections that have been flagged as undisturbed if the interference signal also contains noise and buzzing sounds which impair the input signal continuously.

Figure 3:
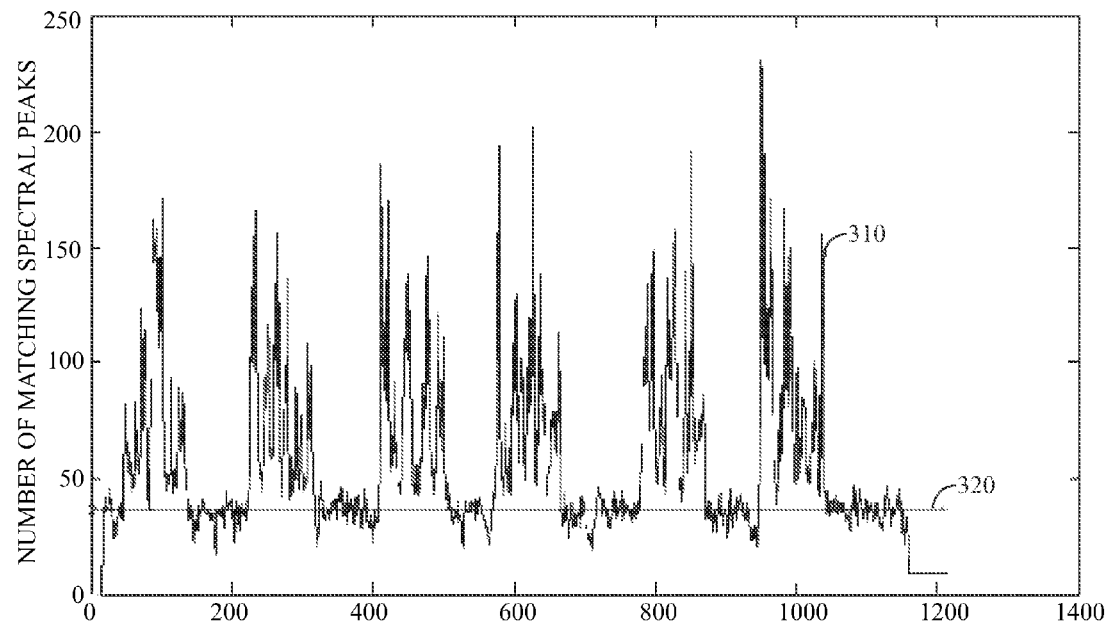
FIG. 3 illustrates the analysis of for the detection of adjacent sections containing interference in a first step.
Figure 4:
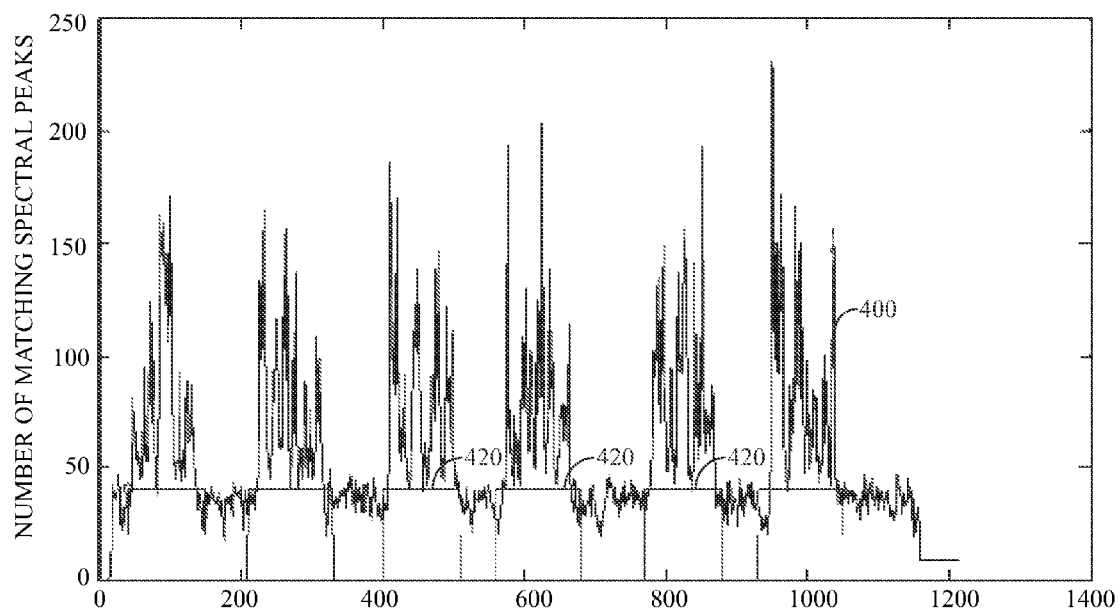
FIG. 4 illustrates the analysis of for the detection of adjacent sections containing interference in a second step.

Turning next to FIGS. 3 and 4, these figures illustrate an embodiment of a temporal curve of the sort used to detect contiguous impaired sections in an audio signal that contain speech content that is partially impaired. In FIG. 3, the curve 310 depicts the number of matching spectral maxima within each signal block. Line 320 represents the average value for the minimum of the contiguous spectral maxima. The vertical axis is the number of matching spectral peaks between the target signal and the noise signal in each window. The horizontal axis is the window number within the target signal.

FIG. 4 illustrates an embodiment of the previous analysis and detection step in a subsequent stage wherein some windows have been categorized as being impaired. The curve 410 is the same as curve 310 and depicts the number of matching spectral maxima for each signal block. The regions that are delimited by the line 420 correspond to sections of the target signal that have been identified as impaired sections.

Figure 5:
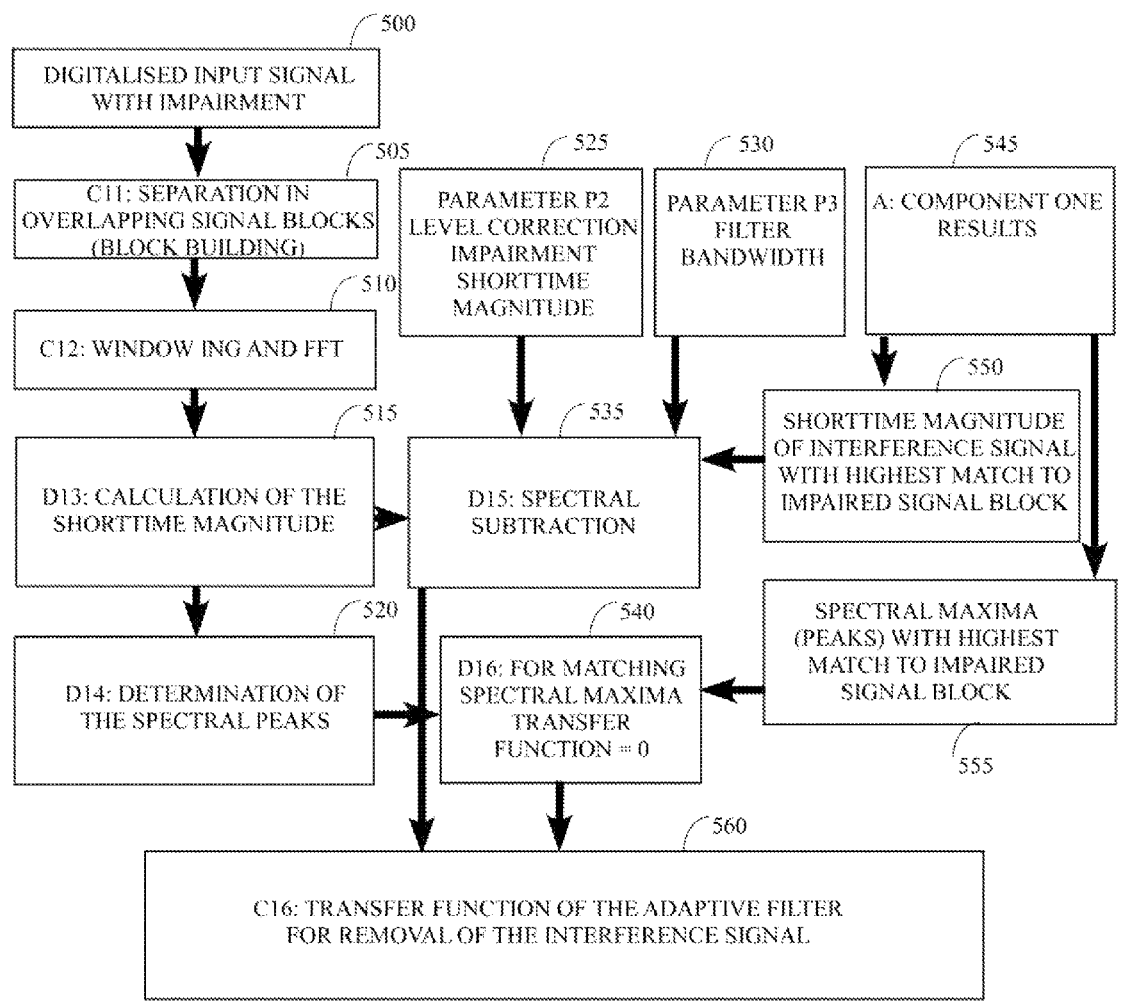
FIG. 5 depicts the calculation of the transfer function of the adaptive filter for removal of the interference signal.

Now turning to the embodiment of FIG. 5, in a next preferred step the transfer function of the adaptive filter will be determined. The calculation of the transfer function is implemented via the process of spectral subtraction (as that term is known and used by those of ordinary skill in the art) using the results of the analysis of the matching spectral maxima (peaks) of the short time magnitude of the impaired input signal and the short time magnitude of the noise signal with highest matching to the impaired signal block. The short time magnitudes and the information about the existing spectral maxima of the interference signal are provided by the results of the analysis carried out by Component A. Note that in some embodiments a separately calculated adaptive filter might be applied to each block, to each groups of blocks (e.g., 10 blocks), or a single calculated adaptive filter might be applied to the entire input signal.

According to one embodiment, the short time magnitude of the noise impaired signal can be determined by implementing the following steps as set out in the example of FIG. 5. First, a digitized audio input signal containing noise-only (or predominantly noise) will be accessed 500, e.g., read from disk, read in real time from a microphone, extracted from a video clip, etc. That signal will then be partitioned into blocks 505, windowed 510 and transformed to the frequency domain 515 (preferably via a FFT). The Component A results will be provided (box 454) as indicated in FIG. 5 which might include the short time magnitude of the interfering signal that has the highest match to the impaired signal block (box 550) as well as the spectral maxima of the peaks with the highest match to the impaired signal block (box 555).

This will be followed by a determination of the absolute value of the short time spectral magnitudes 515 within each window. In this embodiment the steps of windowing and transformation into the frequency domain will be performed in a manner that is analogous to the steps discussed previously in connection with the processing of the digital target signal.

Continuing with the current example, the process of spectral subtraction will be used to determine the transfer function by subtracting the short time magnitude of the interference signal from the associated short time magnitude of the impaired input signal (box 535) according to methods well know to those of ordinary skill in the art. The Parameter P2 has been provided so that a user can adjust the amplitude of the spread of the impairment 525 (e.g., the range of spectral amplitudes that are considered to be dominant, e.g., amplitudes of frequencies that fall 10% of the maximum amplitude) and Parameter P3 can be utilized to adjust the bandwidth of the filter 530 by, for example, restricting the range of frequencies that are considered for matching purposes. For matching spectral maxima (peaks) of the short time magnitude of the impaired input signal and the associated short time magnitude of the interference signal the transfer function can be set to the value zero 540, thereby filtering the target signal so as to attenuate the matching frequencies.

If the value of the parameter P3 is chosen to be relatively low, the contribution of the spectral subtraction in the calculation of the transfer function (box 560) of the filter will be deemphasized. In this case the transfer function will be primarily defined by the matching peaks. Thus, only relevant frequency components of the noise signal will be removed from the target, which provides an advantage in that the damage to the target signal will be reduced. In case of interfering signals with minimal changes in frequency behavior (stationary behavior) this approach presents a sensible alternative to a complete removal of the interfering signal.

After each of the blocks has been filtered and transformed back into the time domain, the filtered blocks will be reassembled to form a modified version of the target signal in which the noise signal has been attenuated. The final product would then be available to be performed for a user. In FIG. 6 the performance might take place using the speaker in a user's computer, as one specific example.

The instant invention might be particularly useful in processing the audio component of a video recording to improve the conversation (or other signal component) therein. It could also be used to attenuate crowd noise during the recording of a live music concert or live speech, among many other uses. It could also be used to attenuate zoom motor noise in video recordings.

Note that for purposes of the instant disclosure that when a "noise signal" or an "impairment signal" is referred to herein, that term should be broadly construed to include instances where there might be some of the signal which it is desired to enhance relative to noise (e.g., speech) within the noise signal but where the noise signal predominantly contains contaminating noise which is it desired to deemphasize or remove from the target signal. The noise signal might be conventional (e.g., white noise, 60 Hz noise, engine noise, etc.) or it might be, for example, music that is playing while an individual is talking. In short, the "noise signal" will be any component of the recorded audio other than the information which it is desired to enhance (e.g., speech).

Note further that when the term "average" is used herein, that term should be broadly construed to include any measure of central tendency (e.g., mean, median, mode, etc.).

Note still further that the method described above could be successively applied to an arbitrarily long target signal (i.e., Components A-D would be applied at a number of different points in the target signal until the entire signal was processed). In that way, nonstationarity in the noise signal could readily be accommodated.

In summary, the instant invention provides a substantial improvement for both novice and professional users when editing audio recordings and primarily for attenuating interference signals in speech signals of video recordings. The instant invention requires minimal user interaction, no definition of multiple parameters, it is an automatic process that analyzes the input signal and incorporates specific processes to process the input signal and to remove interference signals without overly harming the input signal.

CONCLUSIONS

While this invention is susceptible of embodiment in many different forms, there is shown in the drawings, and will herein be described hereinafter in detail, some specific embodiments of the instant invention. It should be understood, however, that the present disclosure is to be considered an exemplification of the principles of the invention and is not intended to limit the invention to the specific embodiments or algorithms so described.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention □ is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners □ of the art to which the invention belongs.

The term "at least" followed by a number is used herein to denote the start of a range beginning with that number (which may be a ranger having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. Terms of approximation (e.g., "about", "substantially", "approximately", etc.) should be interpreted according to their ordinary and customary meanings as used in the associated art unless indicated otherwise. Absent a specific definition and absent ordinary and customary usage in the associated art, such terms should be interpreted to be ±10% of the base value.

When, in this document, a range is given as "(a first number) to (a second number)" or "(a first number)-(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

While this invention is susceptible of embodiment in many different forms, there is shown in the drawings, and is herein described in detail, some specific embodiments. It should be understood, however, that the present disclosure is to be considered an exemplification of the principles of the invention and is not intended to limit it to the specific embodiments or algorithms so described. Those of ordinary skill in the art will be able to make various changes and further modifications, apart from those shown or suggested herein, without departing from the spirit of the inventive concept, the scope of which is to be determined by the following claims.

Further, it should be noted that terms of approximation (e.g., "about", "substantially", "approximately", etc.) are to be interpreted according to their ordinary and customary meanings as used in the associated art unless indicated otherwise herein. Absent a specific definition within this disclosure, and absent ordinary and customary usage in the associated art, such terms should be interpreted to be plus or minus 10% of the base value Of course, many modifications and extensions could be made to the instant invention by those of ordinary skill in the art. For example in one preferred embodiment the instant invention will provide an automatic mode, which automatically attenuates video recordings in video cameras, therewith providing video recordings with improved quality audio.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A method of attenuating a noise signal, wherein is provided an input signal containing said noise signal combined with a target signal, comprising the steps of:
   (a) obtaining a digital representation of the input signal;
   (b) obtaining a digital representation of the noise signal;
   (c) partitioning said digital representation of the input signal into a plurality of input windows, each of said plurality of input windows overlapping another one of said input windows in time;
   (d) selecting one or more of said input windows;
   (e) calculating a input frequency spectrum from each of said selected input windows;
   (f) determining two or more dominant peaks within each of said input window spectra to identify two or more dominant input frequency peaks, each of said two or more dominant input frequency peaks corresponding to a dominant input signal frequency;
   (g) partitioning said digital representation of the noise signal into a plurality of noise windows, each of said plurality of noise windows overlapping another one of said noise windows in time;
   (h) selecting one or more of said noise windows;
   (i) calculating a noise frequency spectrum from each of said selected noise windows;
   (j) using any of said calculated noise frequency spectra to identify two or more dominant noise frequency peaks and a corresponding two or more dominant noise frequencies;
   (k) for each of said input windows, using said at least two dominant input frequency peaks at said at least two dominant input signal frequencies associated with each of said input windows to match said plurality of dominant noise frequency peaks at said plurality of dominant noise frequencies;
   (l) for each of said input windows, obtaining a count of a number of dominant signal frequency peaks that match said dominant noise frequency peaks;
   (m) calculating an average count from all of said counts obtained from each of said input windows;
   (n) identifying each input window whose count is greater than said average count;
   (o) for each identified input window, using at least a portion of said matching frequencies within said identified input window to construct a transfer function for said identified input window and applying said transfer function to said identified input window, thereby producing a filtered block;
   (p) combining each of said filtered blocks corresponding to each of said input windows and any of said input windows not identified to form a filtered input signal, thereby attenuating said noise signal within said target signal relative to said target signal; and,
   (q) performing at least a portion of said filtered input signal for a user.

2. The method according to claim 1, wherein step (c) comprises the step of partitioning said digital representation of the input signal into ten overlapping input windows.

3. The method according to claim 1, wherein step (n) comprises the step of identifying each input window whose count is greater than 50 and less than 250.

4. The method according to claim 1, wherein step (n) comprises the steps of:
   (n1) identifying each input window whose count is greater than said average count,
   (n2) for at least one of said identified each input window, identifying an adjacent input window if an adjacent input window count is greater than said average count.

5. The method according to claim 1, wherein said transfer function of step (o) is constructed using spectral subtraction.

6. The method according to claim 5, wherein said transfer function of step (o) is constructed using spectral subtraction and wherein said matching frequencies in said transfer function are set to zeros.

* * * * *